US012726765B2

(12) United States Patent
Thomas et al.

(10) Patent No.: US 12,726,765 B2
(45) Date of Patent: Sep. 1, 2026

(54) METHOD AND APPARATUS FOR SPEAKER MATRIX

(71) Applicant: Bryx, Inc., Rochester, NY (US)

(72) Inventors: David Thomas, Rochester, NY (US); Trevor Sherrard, Rochster, NY (US)

(73) Assignee: Bryx, Inc., Rochester, NY (US)

( * ) Notice: Subject to any disclaimer, the term of this patent is extended or adjusted under 35 U.S.C. 154(b) by 351 days.

(21) Appl. No.: 18/463,346

(22) Filed: Sep. 8, 2023

(65) Prior Publication Data

US 2024/0089658 A1 Mar. 14, 2024

Related U.S. Application Data

(60) Provisional application No. 63/374,971, filed on Sep. 8, 2022.

(51) Int. Cl.
*H04R 3/12* (2006.01)
*H04R 5/04* (2006.01)

(52) U.S. Cl.
CPC ................. *H04R 3/12* (2013.01); *H04R 5/04* (2013.01); *H04R 2420/01* (2013.01)

(58) Field of Classification Search
CPC ......... H04R 3/12; H04R 5/04; H04R 2420/01
See application file for complete search history.

(56) References Cited

U.S. PATENT DOCUMENTS 7,412,067 B2 * 8/2008 Koyama .............. H04R 29/008 381/300
8,270,631 B2 * 9/2012 Kusunoki ................ H04R 5/04 381/120
9,386,392 B2 * 7/2016 Millen ............. H04N 21/42224
10,050,707 B2 * 8/2018 Hurwitz ............... H04M 11/025
10,250,983 B1 * 4/2019 Graham .................. G06F 3/162
11,288,035 B2 * 3/2022 Noto ........................ H04R 3/00
11,595,757 B2 * 2/2023 Suyama .................... H04S 7/30
11,962,997 B2 * 4/2024 Robinson ................ G10L 19/20
12,149,913 B2 * 11/2024 Shumard ............... G10L 19/008
2010/0303260 A1 * 12/2010 Stieler von Heydekampf ............ H04H 60/04 381/119
2013/0315416 A1 * 11/2013 Nakayama ............... H04R 3/12 381/77
2022/0146669 A1 * 5/2022 Simpson ............. G01S 7/52047
2023/0071138 A1 * 3/2023 Cheong ..................... H04R 3/12
2023/0328127 A1 * 10/2023 Williams ............... H04H 60/04 709/221
2024/0315661 A1 * 9/2024 Artunduaga ........... H04R 1/403

FOREIGN PATENT DOCUMENTS

CN 113148181 A * 7/2021 ............. B64D 15/00

* cited by examiner

*Primary Examiner* — Paul W Huber
(74) *Attorney, Agent, or Firm* — Lowenstein Sandler LLP

(57) ABSTRACT

A speaker control system, including a speaker matrix, including a de-multiplexer including one or more audio control relays, a control unit operatively arranged to set the state of the one or more audio control relays, and determine the state of the one or more audio control relays, and a communication module.

18 Claims, 3 Drawing Sheets

METHOD AND APPARATUS FOR SPEAKER MATRIX

CROSS-REFERENCE TO RELATED APPLICATIONS

This application claims the benefit under 35 U.S.C. § 119(e) of U.S. Provisional Application No. 63/374,971, filed Sep. 8, 2022, which application is incorporated herein by reference in its entirety.

BACKGROUND OF THE DISCLOSURE

Field

The present disclosure relates generally to speaker control systems, and more particularly, to a speaker control matrix that de-multiplexes multiplex signals and sets and determines the state of individual audio control relay states.

Description of Related Art

A speaker matrix or matrix mixer is an audio electronics device that routes multiple input audio signals to multiple outputs. A speaker matrix usually employs level controls such as potentiometers to determine how much of each input is going to each output, and it can incorporate simple on/off assignment buttons. The number of individual controls is at least the number of inputs multiplied by the number of outputs. Matrix mixers may be incorporated into larger devices such as mixing consoles or they may be a standalone product. They always have routing and level controls and may also include other features. Matrix mixers are often used in a complex listening space to send audio signals to different loudspeaker zones.

However, current speaker matrix designs do not allow for de-multiplexing multiplexed audio signals. Additionally current speaker matrix designs do not have the capability to expose direct control and check the status of each individual audio control relay state using an application programming interface (API). Rather, current speaker matrix designs expose direct control of each individual relay through the use of a digital input signal, which requires additional hardware.

SUMMARY

In view of the forgoing, it is an object of the present disclosure to provide a speaker control system and speaker matrix that can de-multiplex multiplex audio signals as well as expose direct control over individual audio control relay states using an API.

An exemplary embodiment of the present disclosure provides a speaker control system, including a speaker matrix, including a de-multiplexer including one or more audio control relays, a control unit operatively arranged to set the state of the one or more audio control relays, and determine the state of the one or more audio control relays, and a communication module.

In an exemplary embodiment, the communication module is connected to a network. In an exemplary embodiment, the communication module is operatively arranged to communicate with the control unit via a serial peripheral interface (SPI). In an exemplary embodiment, the control unit comprises an API arranged to determine the state of the one or more audio control relays. In an exemplary embodiment, the API is a REST API. In an exemplary embodiment, the speaker control system further comprises an amplifier operatively arranged to transmit an audio signal to the de-multiplexer. In an exemplary embodiment, the speaker control system further comprises an amplifier operatively arranged to transmit a multiplexed audio signal to the de-multiplexer.

In an exemplary embodiment, the speaker control system further comprises a plurality of speaker groups connected to the de-multiplexer. In an exemplary embodiment, the de-multiplexer is operatively arranged to receive a multiplexed audio signal, de-multiplex the multiplexed audio signal into a plurality of individual audio streams, and send the plurality of individual audio streams to the plurality of speaker groups. In an exemplary embodiment, the control unit is operatively arranged to energize an audio control relay of the one or more audio control relays to mute a respective speaker group of the plurality of speaker groups. In an exemplary embodiment, the control unit is operatively arranged to de-energize an audio control relay of the one or more audio control relays to allow a respective speaker group of the plurality of speaker groups to produce sound.

An exemplary embodiment of the present disclosure provides a speaker control system, comprising a speaker matrix, including a de-multiplexer comprising a first audio control relay and a second audio control relay, a control unit operatively arranged to set a state of the first audio control relay and a state of the second audio control relay, and determine the state of the first audio control relay and state of the second audio control relay, and a communication module, a first speaker group connected to the de-multiplexer and associated with the first audio control relay, and a second speaker group connected to the de-multiplexer and associated with the second audio control relay.

In an exemplary embodiment, the communication module is connected to a network. In an exemplary embodiment, the communication module is operatively arranged to communicate with the control unit via a serial peripheral interface (SPI). In an exemplary embodiment, the control unit comprises an application programming interface (API) arranged to determine the state of the first audio control relay and the state of the second audio control relay. In an exemplary embodiment, the API is a REST API. In an exemplary embodiment, wherein the speaker control system further comprises an amplifier operatively arranged to transmit a multiplexed audio signal to the de-multiplexer.

In an exemplary embodiment, the de-multiplexer is operatively arranged to receive a multiplexed audio signal, de-multiplex the multiplexed audio signal into a plurality of individual audio streams, and send the plurality of individual audio streams to at least one of the first speaker group and the second speaker group. In an exemplary embodiment, the control unit is operatively arranged to energize the first audio control relay and the second audio control relay to mute the first speaker group and the second speaker group, respectively. In an exemplary embodiment, the control unit is operatively arranged to de-energize the first audio control relay and the second audio control relay to allow the first speaker group and the second speaker group, respectively, to produce sound.

These and other objects, features, and advantages of the present disclosure will become readily apparent upon a review of the following detailed description of the disclosure, in view of the drawings and appended claims.

BRIEF DESCRIPTION OF THE SEVERAL VIEWS OF THE DRAWING(S)

The accompanying drawings are incorporated herein as part of the specification. The drawings described herein illustrate embodiments of the presently disclosed subject matter and are illustrative of selected principles and teachings of the present disclosure, in which corresponding reference symbols indicate corresponding parts. However, the drawings do not illustrate all possible implementations of the presently disclosed subject matter and are not intended to limit the scope of the present disclosure in any way.

DETAILED DESCRIPTION

Figure 1:
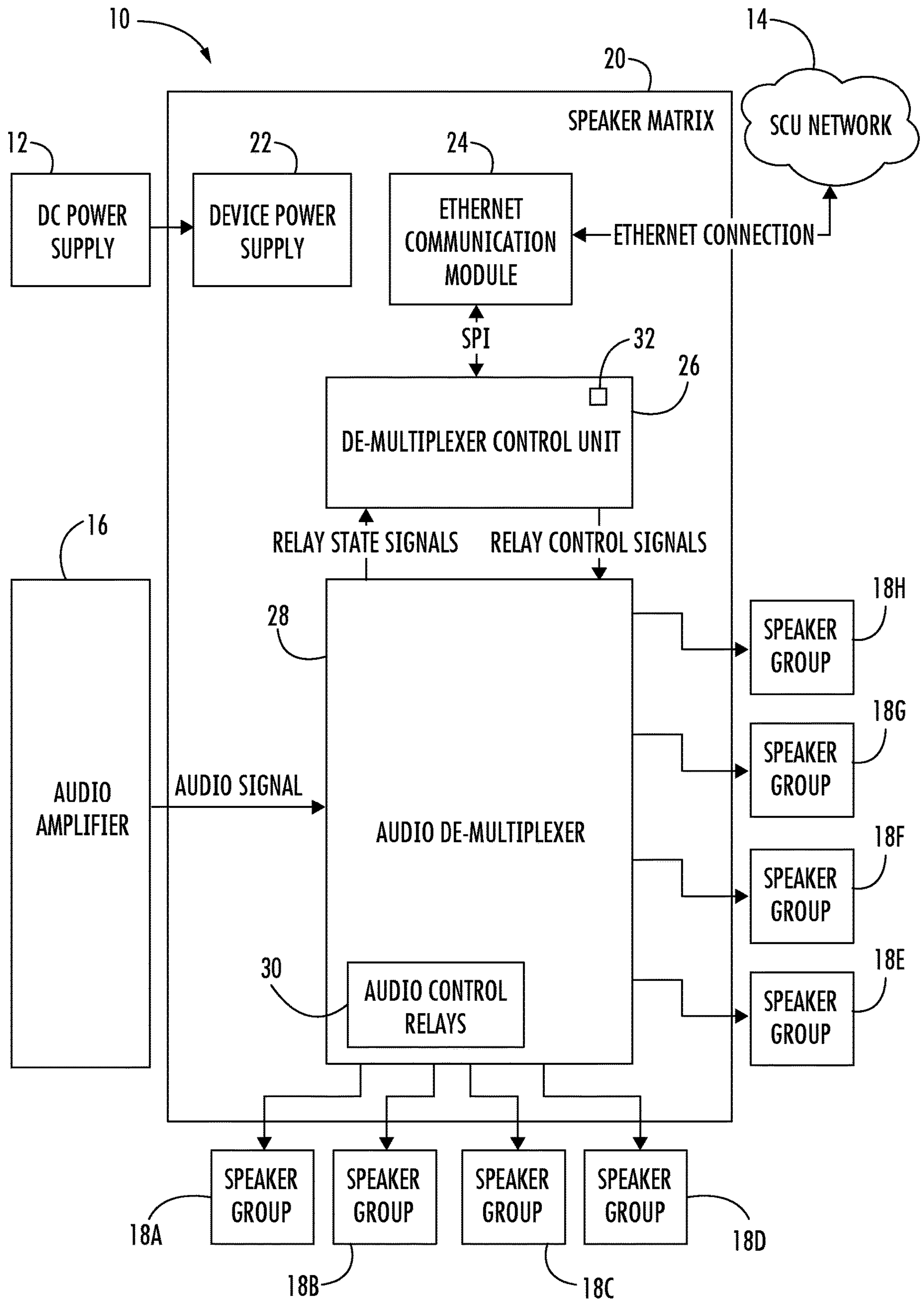
FIG. 1 is a functional block diagram illustrating a speaker control system, in accordance with some embodiments of the present disclosure.

At the outset, it should be appreciated that like drawing numbers on different drawing views identify identical, or functionally similar, structural elements. It is to be understood that the claims are not limited to the disclosed aspects.

Furthermore, it is understood that this disclosure is not limited to the particular methodology, materials and modifications described and as such may, of course, vary. It is also understood that the terminology used herein is for the purpose of describing particular aspects only, and is not intended to limit the scope of the claims.

Unless defined otherwise, all technical and scientific terms used herein have the same meaning as commonly understood to one of ordinary skill in the art to which this disclosure pertains. It should be understood that any methods, devices or materials similar or equivalent to those described herein can be used in the practice or testing of the example embodiments.

It should be appreciated that the term "substantially" is synonymous with terms such as "nearly," "very nearly," "about," "approximately," "around," "bordering on," "close to," "essentially," "in the neighborhood of," "in the vicinity of," etc., and such terms may be used interchangeably as appearing in the specification and claims. It should be appreciated that the term "proximate" is synonymous with terms such as "nearby," "close," "adjacent," "neighboring," "immediate," "adjoining," etc., and such terms may be used interchangeably as appearing in the specification and claims. The term "approximately" is intended to mean values within ten percent of the specified value.

It should be understood that use of "or" in the present application is with respect to a "non-exclusive" arrangement, unless stated otherwise. For example, when saying that "item x is A or B," it is understood that this can mean one of the following: (1) item x is only one or the other of A and B; (2) item x is both A and B. Alternately stated, the word "or" is not used to define an "exclusive or" arrangement. For example, an "exclusive or" arrangement for the statement "item x is A or B" would require that x can be only one of A and B. Furthermore, as used herein, "and/or" is intended to mean a grammatical conjunction used to indicate that one or more of the elements or conditions recited may be included or occur. For example, a device comprising a first element, a second element and/or a third element, is intended to be construed as any one of the following structural arrangements: a device comprising a first element; a device comprising a second element; a device comprising a third element; a device comprising a first element and a second element; a device comprising a first element and a third element; a device comprising a first element, a second element and a third element; or a device comprising a second element and a third element.

Moreover, as used herein, the phrases "comprises at least one of" and "comprising at least one of" in combination with a system or element is intended to mean that the system or element includes one or more of the elements listed after the phrase. For example, a device comprising at least one of: a first element; a second element; and a third element, is intended to be construed as any one of the following structural arrangements: a device comprising a first element; a device comprising a second element; a device comprising a third element; a device comprising a first element and a second element; a device comprising a first element and a third element; a device comprising a first element, a second element and a third element; or a device comprising a second element and a third element. A similar interpretation is intended when the phrase "used in at least one of:" is used herein.

Referring now to the figures, FIG. 1 is a functional block diagram illustrating speaker control system 10, in accordance with exemplary embodiments of the present disclosure. Speaker control system 10 generally comprises an apparatus for speaker control or speaker matrix 20. In an exemplary embodiment, speaker control system 10 further comprises power supply 12, amplifier 16, and/or one or more audio zones or speakers or speaker groups, for example, speaker groups 18A-18H. In an exemplary embodiment, speaker control system 10 further comprises network or system control unit (SCU) network 14.

Each speaker group of speaker groups 18A-18H comprises one or more speakers. Speaker groups 18A-18H are connected to speaker matrix 20, and specifically, to de-multiplexer 28, as will be described in greater detail below. In an exemplary embodiment, each one of the plurality of speaker groups 18A-18H are located at different locations or positions with respect to one another. It should be appreciated that embodiments of the present disclosure provide that more than one speaker group of speaker groups 18A-18H can be grouped together such that more than one speaker group of speaker groups 18A-18H are located at or in close vicinity to one another (e.g., within the same room, corridor, hallway, etc.) within a particular building. Embodiments of the present disclosure provide that one or more speaker group of speaker groups 18A-18H are located in designated locations (e.g., rooms, corridors, hallways, etc.) within a particular building. In an exemplary embodiment, speaker control system 10 comprises eight speaker groups or physical zones 18A-18H at 230W per zone.

In an exemplary embodiment, speaker matrix 20 comprises communication module 24, de-multiplexer control unit or control unit 26, and de-multiplexer 28. In an exemplary embodiment, speaker matrix 20 further comprises device power supply 22. De-multiplexer 28 is an electronic device that separates a multiplex signal into its component parts. Specifically, de-multiplexer 28 is an audio de-multiplexer operatively arranged to separate a single multiplex signal from amplifier 16 into various components and sends them to their respective speaker groups 18A-18H for decoding. De-multiplexer 28 is connected to amplifier 16, for example, through wired or wireless connection, and receives an audio signal therefrom. In an exemplary embodiment, de-multiplexer 28 is a 70V audio de-multiplexer. In an exemplary embodiment, de-multiplexer 28 comprises one or more audio control relays 30. In an exemplary embodiment, amplifier 16 is a 70V audio amplifier. In an exemplary embodiment, speaker matrix 20 is a network-controlled audio de-multiplexer for routing 70-volt audio signals from a single 70-volt audio amplifier 16 to one or more speaker groups 18A-18H. In an exemplary embodiment, speaker matrix 20 is powered by a 24-volt direct current power supply 12. Power supply 12 may be connected to device power supply 22 within speaker matrix 20. One advantage of speaker matrix 20 of the present disclosure is that it transforms a standard 70-volt amplifier into a zoned-amplifier with minimal additional hardware.

De-multiplexer 28 is connected to and controlled by de-multiplexer control unit 26. De-multiplexer control unit 26 is operatively arranged to activate and deactivate audio grade control relays to disable routing audio to specific speaker groups 18A-18H, effectively muting that speaker group while the relay is energized, for example, using speaker control program 32. In an exemplary embodiment, de-multiplexer control unit 26 is operatively arranged to send relay control signals to de-multiplexer 28, for example to activate and deactivate the audio control relays 30 and control audio output to speaker groups 18A-18H, for example, using speaker control program 32. In an exemplary embodiment, de-multiplexer control unit 26 is operatively arranged to query de-multiplexer 28 to receive relay state signals and determine the state of each control relay (i.e., determine the audio signal being output through speaker groups 18A-18H), for example, using speaker control program 32. The ability of speaker matrix 20 to set the state of each of the individual audio control relays 30 as well as receive and communicate (e.g., via SCU network) the status of each of the individual audio control relays 30 is a key feature of speaker matrix 20. In an exemplary embodiment, a software component, namely, speaker control program 32, interfacing with an API is used to set the state of one or more control relays and subsequently check the state of the one or more control relays to verify they have transitioned appropriately (i.e., from energized to deenergized, or from deenergized to energized).

As shown, de-multiplexer control unit 26 is connected to and communicates with communication module 24, for example, via a serial peripheral interface (SPI), although it should be appreciated that other connection means may be used. Communication module 24 is operatively arranged to communicate with SCU network 14. In an exemplary embodiment, communication module 24 is an ethernet communication module connected to SCU network 14 via an ethernet connection. It should be appreciated that, although the external ethernet connection in FIG. 1 indicates that speaker matrix 20 is connected to SCU network 14. In an exemplary embodiment speaker matrix 20 may be connected to any standard network with the ability to assign IP addresses via dynamic host configuration protocol (DHCP).

De-multiplexer control unit 26 may be a hardware device that, inter alia, activates and deactivates audio grade control relays, sends relay control signals, queries de-multiplexer 28 to receive relay state signals and determine the state of each control relay, and/or sets the state of one or more control relays, for example, using speaker control program 32. De-multiplexer control unit 26 is capable of communicating with de-multiplexer 28, audio control relays 30, communication module 24, SCU network 14, amplifier 16, and/or speaker groups 18A-18H. In exemplary embodiments, de-multiplexer control unit 26 may include a computer. In exemplary embodiments, de-multiplexer control unit 26 may include internal and external hardware components, as depicted and described in further detail with respect to FIG. 3. In exemplary embodiments, speaker control program 32 is implemented on a web server, which may be a management server, a web server, or any other electronic device or computing system capable of receiving and sending data. The web server can represent a computing system utilizing clustered computers and components to act as a single pool of seamless resources when accessed through a network. The web server may include internal and external hardware components, as depicted and described in further detail with respect to FIG. 3.

Speaker control program 32 can activate and deactivate audio grade control relays, send relay control signals, query de-multiplexer 28 to receive relay state signals and determine the state of each control relay, and/or set the state of one or more control relays based on the various methods disclosed herein. Speaker control program 32 can generally include any software capable of controlling speakers according to the methods disclosed herein.

In an exemplary embodiment, speaker control system 10 comprises a representational state transfer (REST) API (also known as RESTful API) to expose direct control of each individual audio control relay state. A REST API is an API that conforms to the constraints of REST architectural style and allows for interaction with RESTful web services. This implemented REST API allows external software components to make HTTP requests to set and obtain the state of each individual audio zone relay. In an exemplary embodiment, speaker matrix 20 obtains an IP address on startup through DHCP.

Figure 2:
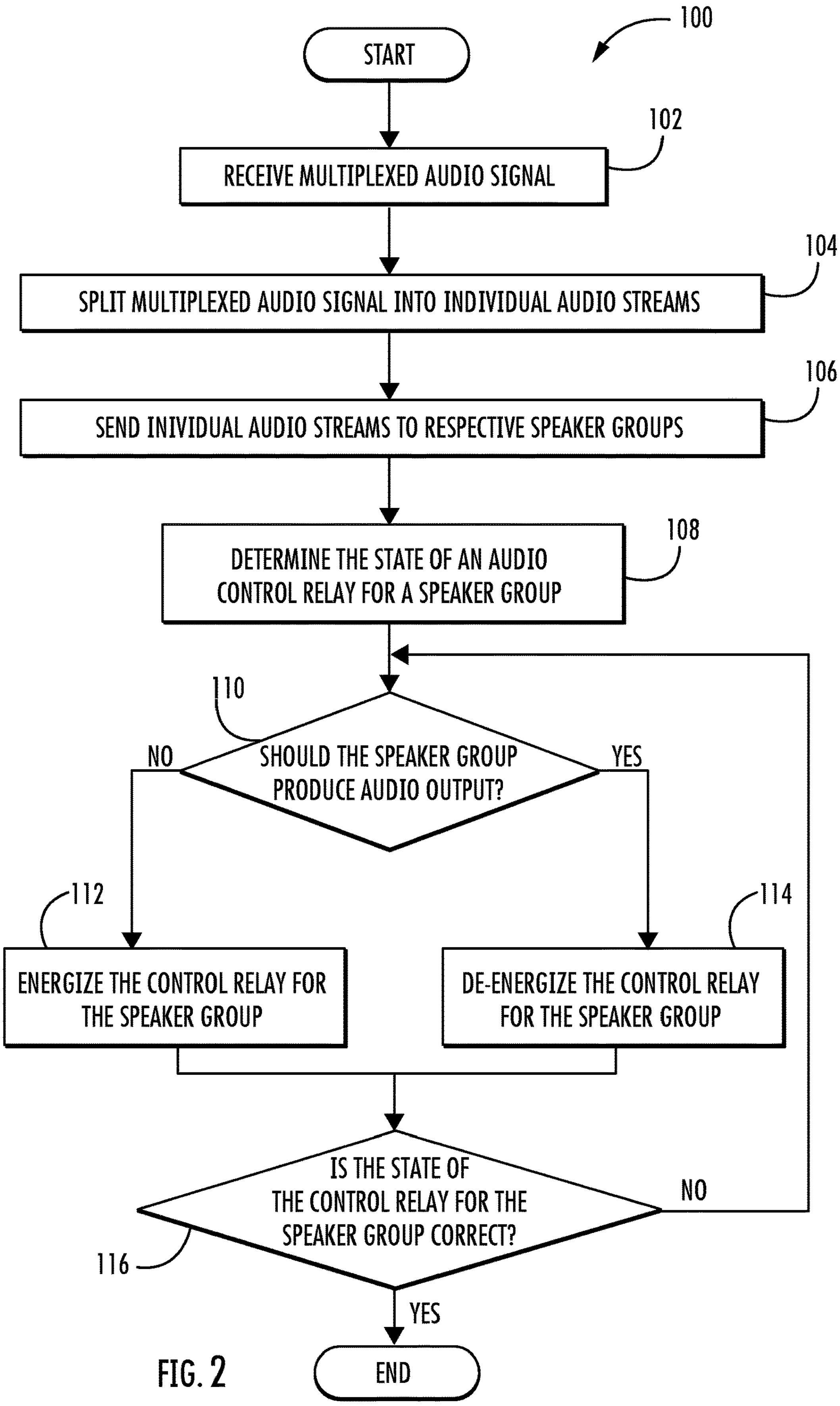
FIG. 2 is a flow chart depicting operational steps for controlling speakers.

FIG. 2 shows flow chart 100 depicting operational steps for controlling speakers.

In step 102, speaker control program 32 receives a multiplexed audio signal. For example, de-multiplexer 28 may receive the multiplexed audio signal from amplifier 16.

In step 104, speaker matrix 20 splits the multiplexed audio signal into individual audio streams.

In step 106, speaker control program 32 sends the individual audio streams to their respective speaker groups 18A-18H.

In step 108, speaker control program 32 determines the state of audio control relay 30 for a specific speaker group, for example, speaker group 18A. It should be appreciated that this step could be repeated for additional speaker groups or every speaker group.

In step 110, speaker control program 32 determines whether the specific speaker group should produce audio output. For example, speaker control program 32 determines whether speaker group 18A should produce audio output.

If, in step 110, speaker control program 32 determines that the specific speaker group 18A should not produce audio output, then in step 112 speaker control program 32 energizes audio control relay 30 for speaker group 18A.

If, in step 110, speaker matrix 20 determines that the specific speaker group 18A should produce audio output, then in step 114 speaker control program 32 de-energizes audio control relay 30 for speaker group 18A.

In step 116, speaker control program 32 determines if the state of control relay 30 for the specific speaker group 18A is correct.

If, in step 116, speaker control program 32 determines that the state of control relay 30 for the specific speaker group 18A is incorrect, then the program proceeds back to step 110, wherein speaker control program 32 will determine the desired state of speaker group 18A and act accordingly (i.e., via step 112 or step 114).

If, in step 116, speaker control program 32 determines that the state of control relay 30 for the specific speaker group 18A is correct, then the program ends. It should be appreciated that, following a determination that the state of control relay 30 for the specific speaker group 18A is correct, the program may restart from step 108 at a predetermined interval. For example, speaker control program 32 may wait thirty minutes and then proceed to step 108, wherein speaker control program 32 again checks the state of control relay 30 for speaker group 18A. This recurring process ensures proper working condition of control relays 30 and speaker control system 10.

Figure 3:
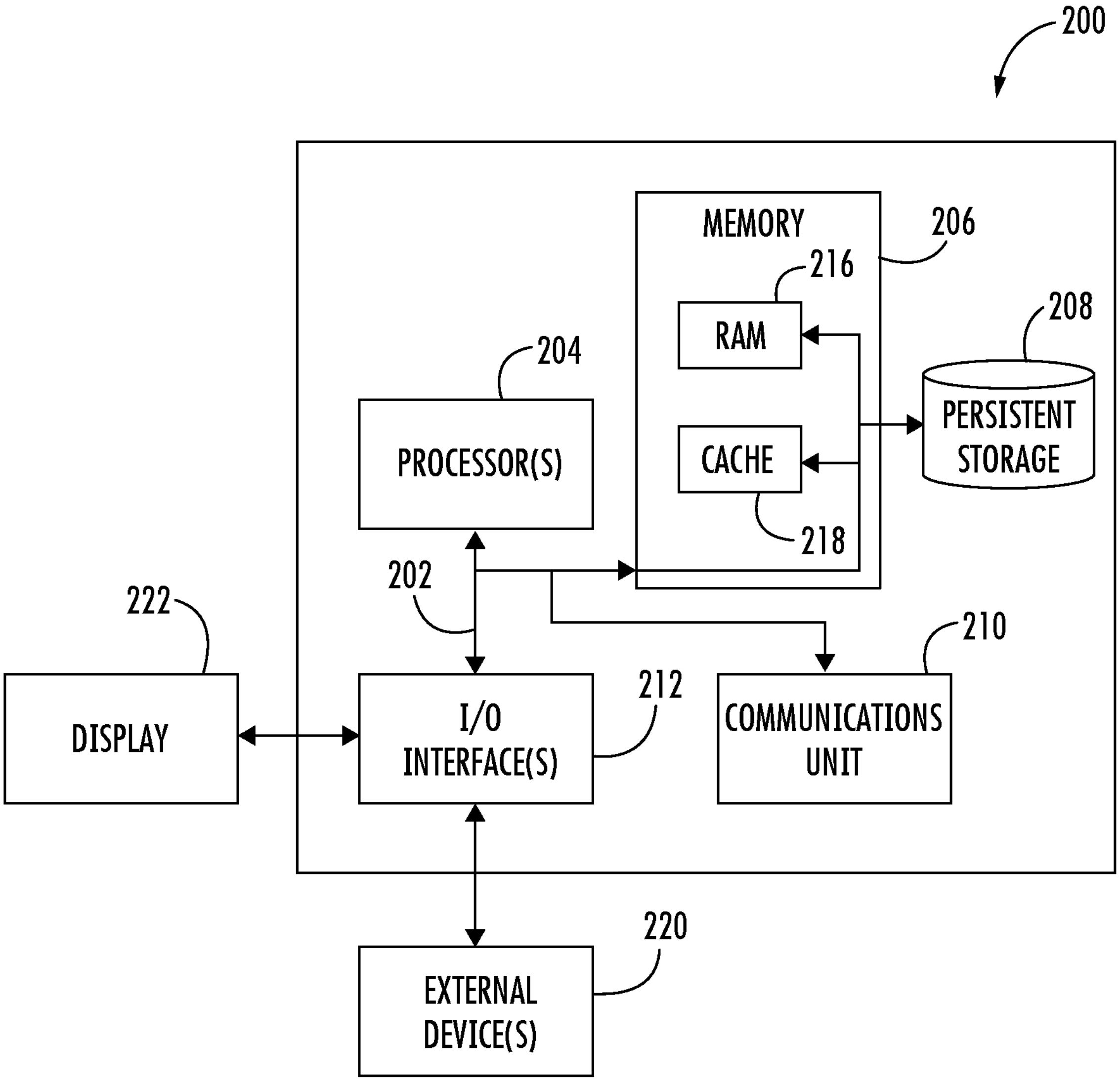
FIG. 3 is a block diagram of internal and external components of a computing device, in accordance with exemplary embodiments of the present disclosure.

FIG. 3 is a block diagram of internal and external components of computing device or computer system 200, which is representative of an exemplary embodiment of the computing device or control unit of FIG. 1, in accordance with some embodiments of the present disclosure. It should be appreciated that FIG. 3 provides only an illustration of one implementation and does not imply any limitations with regard to the environments in which different embodiments may be implemented. In general, the components illustrated in FIG. 3 are representative of any electronic device capable of executing machine-readable program instructions. Examples of computer systems, environments, and/or configurations that may be represented by the components illustrated in FIG. 3 include, but are not limited to, personal computer systems, server computer systems, thin clients, thick clients, laptop computer systems, tablet computer systems, cellular telephones (i.e., smart phones), multiprocessor systems, microprocessor-based systems, network PCs, minicomputer systems, mainframe computer systems, and distributed cloud computing environments that include any of the above systems or devices.

Computing device 200 includes communications fabric 202, which provides for communications between one or more processing units 204, memory 206, persistent storage 208, communications unit 210, and one or more input/output (I/O) interfaces 212. Communications fabric 202 can be implemented with any architecture designed for passing data and/or control information between processors (such as microprocessors, communications and network processors, etc.), system memory, peripheral devices, and any other hardware components within a system. For example, communications fabric 202 can be implemented with one or more buses.

Memory 206 and persistent storage 208 are computer readable storage media. In this embodiment, memory 206 includes random access memory (RAM) 216 and cache memory 218. In general, memory 206 can include any suitable volatile or non-volatile computer readable storage media. Software is stored in persistent storage 208 for execution and/or access by one or more of the respective processors 204 via one or more memories of memory 204.

Persistent storage 208 may include, for example, a plurality of magnetic hard disk drives. Alternatively, or in addition to magnetic hard disk drives, persistent storage 208 can include one or more solid state hard drives, semiconductor storage devices, read-only memories (ROM), erasable programmable read-only memories (EPROM), flash memories, or any other computer readable storage media that is capable of storing program instructions or digital information.

The media used by persistent storage 208 can also be removable. For example, a removable hard drive can be used for persistent storage 208. Other examples include optical and magnetic disks, thumb drives, and smart cards that are inserted into a drive for transfer onto another computer readable storage medium that is also part of persistent storage 208.

Communications unit 210 provides for communications with other computer systems or devices via a network. In this exemplary embodiment, communications unit 210 includes network adapters or interfaces such as a TCP/IP adapter cards, wireless Wi-Fi interface cards, or 3G, 4G, or 5G wireless interface cards or other wired or wireless communications links. The network can comprise, for example, copper wires, optical fibers, wireless transmission, routers, firewalls, switches, gateway computers and/or edge servers. Software and data used to practice embodiments of the present disclosure can be downloaded to computing device 200 through communications unit 210 (i.e., via the Internet, a local area network, or other wide area network). From communications unit 210, the software and data can be loaded onto persistent storage 208.

One or more I/O interfaces 212 allow for input and output of data with other devices that may be connected to computing device 200. For example, I/O interface 212 can provide a connection to one or more external devices 220 such as a keyboard, computer mouse, touch screen, virtual keyboard, touch pad, pointing device, or other human interface devices. External devices 220 can also include portable computer readable storage media such as, for example, thumb drives, portable optical or magnetic disks, and memory cards. I/O interface 212 also connects to display 222.

Display 222 provides a mechanism to display data to a user and can be, for example, a computer monitor. Display 222 can also be an incorporated display and may function as a touch screen, such as a built-in display of a tablet computer.

The present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be appreciated that various aspects of the disclosure above and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims.

REFERENCE NUMERALS

10 Speaker control system
12 Power Supply
14 Network
16 Amplifier
18A Audio zone or speaker or speaker group
18B Audio zone or speaker or speaker group
18C Audio zone or speaker or speaker group
18D Audio zone or speaker or speaker group
18E Audio zone or speaker or speaker group
18F Audio zone or speaker or speaker group
18G Audio zone or speaker or speaker group
18H Audio zone or speaker or speaker group
20 Apparatus for speaker control or speaker matrix
22 Power supply
24 Communication module
26 De-multiplexer control unit or control unit
28 De-multiplexer
30 Audio control relay(s)
32 Speaker control program
100 Flow chart
102 Step
104 Step
106 Step
108 Step
110 Step
112 Step
114 Step
116 Step
200 Computing device
202 Communications fabric
204 Processing units
206 Memory
208 Persistent storage

210 Communications unit
212 Input/output (I/O) interfaces
216 Random access memory (RAM)
218 Cache memory
220 External device(s)
222 Display

What is claimed is:

1. A speaker control system, comprising:
a speaker matrix, including:
a de-multiplexer comprising one or more audio control relays;
a control unit operatively arranged to:
set the state of the one or more audio control relays; and
determine the state of the one or more audio control relays, wherein the control unit comprises an application programming interface (API) arranged to determine the state of the one or more audio control relays; and
a communication module.

2. The speaker control system as recited in claim 1, wherein the communication module is connected to a network.

3. The speaker control system as recited in claim 1, wherein the communication module is operatively arranged to communicate with the control unit via a serial peripheral interface (SPI).

4. The speaker control system as recited in claim 1, wherein the API is a REST API.

5. The speaker control system as recited in claim 1, further comprising an amplifier operatively arranged to transmit an audio signal to the de-multiplexer.

6. The speaker control system as recited in claim 1, further comprising an amplifier operatively arranged to transmit a multiplexed audio signal to the de-multiplexer.

7. The speaker control system as recited in claim 1, further comprising a plurality of speaker groups connected to the de-multiplexer.

8. The speaker control system as recited in claim 7, wherein the de-multiplexer is operatively arranged to:
receive a multiplexed audio signal;
de-multiplex the multiplexed audio signal into a plurality of individual audio streams; and
send the plurality of individual audio streams to the plurality of speaker groups.

9. The speaker control system as recited in claim 7, wherein the control unit is operatively arranged to energize an audio control relay of the one or more audio control relays to mute a respective speaker group of the plurality of speaker groups.

10. The speaker control system as recited in claim 7, wherein the control unit is operatively arranged to de-energize an audio control relay of the one or more audio control relays to allow a respective speaker group of the plurality of speaker groups to produce sound.

11. A speaker control system, comprising:
a speaker matrix, including:
a de-multiplexer comprising a first audio control relay and a second audio control relay;
a control unit operatively arranged to:
set a state of the first audio control relay and a state of the second audio control relay; and
determine the state of the first audio control relay and the state of the second audio control relay, wherein the control unit comprises an application programming interface (API) arranged to determine the state of the first audio control relay and the state of the second audio control relay; and
a communication module;
a first speaker group connected to the de-multiplexer and associated with the first audio control relay; and
a second speaker group connected to the de-multiplexer and associated with the second audio control relay.

12. The speaker control system as recited in claim 11, wherein the communication module is connected to a network.

13. The speaker control system as recited in claim 11, wherein the communication module is operatively arranged to communicate with the control unit via a serial peripheral interface (SPI).

14. The speaker control system as recited in claim 11, wherein the API is a REST API.

15. The speaker control system as recited in claim 11, further comprising an amplifier operatively arranged to transmit a multiplexed audio signal to the de-multiplexer.

16. The speaker control system as recited in claim 11, wherein the de-multiplexer is operatively arranged to:
receive a multiplexed audio signal;
de-multiplex the multiplexed audio signal into a plurality of individual audio streams; and
send the plurality of individual audio streams to at least one of the first speaker group and the second speaker group.

17. The speaker control system as recited in claim 11, wherein the control unit is operatively arranged to energize the first audio control relay and the second audio control relay to mute the first speaker group and the second speaker group, respectively.

18. The speaker control system as recited in claim 11, wherein the control unit is operatively arranged to de-energize the first audio control relay and the second audio control relay to allow the first speaker group and the second speaker group, respectively, to produce sound.

* * * * *